(No Model.)

G. PAIST.
NUT LOCK.

No. 290,999. Patented Dec. 25, 1883.

WITNESSES
Villette Anderson
Philip P. C. Masi

INVENTOR
George Paist,
by Anderson & Smith
his ATTORNEYS

UNITED STATES PATENT OFFICE.

GEORGE PAIST, OF PHILADELPHIA, ASSIGNOR OF ONE-HALF TO EDWARD PAIST, OF WEST CHESTER, PENNSYLVANIA.

NUT-LOCK.

SPECIFICATION forming part of Letters Patent No. 290,999, dated December 25, 1883.

Application filed April 8, 1882. Renewed November 28, 1883. (No model.)

*To all whom it may concern:*

Be it known that I, GEORGE PAIST, a citizen of the United States, residing at Philadelphia, in the county of Philadelphia and State of Pennsylvania, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
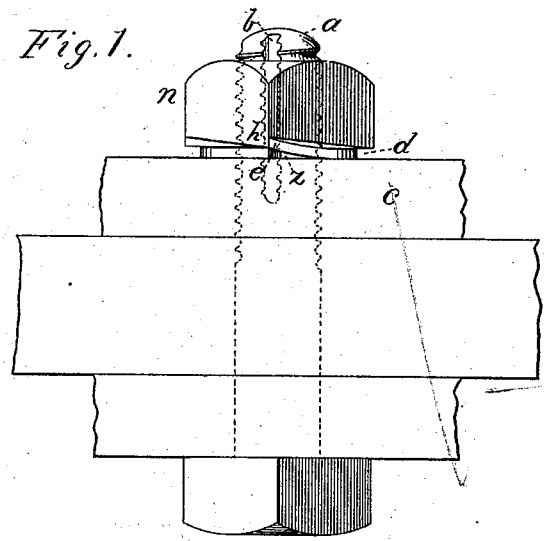
Figure 2:
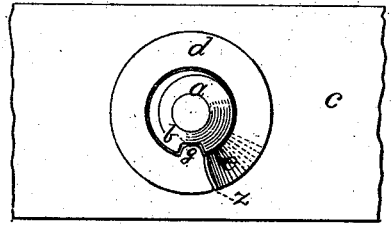
Figure 3:
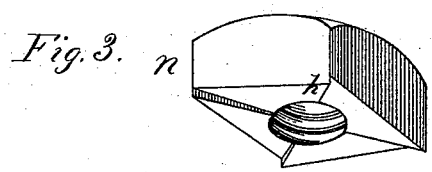

Figure 1 of the drawings represents a top or plan view of my improved nut-lock. Fig. 2 represents a side view of the same, and Fig. 3 is a perspective view of the nut.

This invention has relation to means for locking nuts on bolts; and it consists in the construction and novel arrangement of the divided or open ring-washer, having one resilient end bent out of the general plane of the washer and the other end formed with an internal projection or nib, in connection with a ratchet-base nut and a grooved bolt, all as hereinafter set forth.

The object of this invention is to provide a simple and durable device for locking nuts, which is easily applied, effective in operation, not liable to casual disarrangement, and yet easily loosened when necessary.

In the accompanying drawings, the letter $a$ designates a bolt, having a longitudinal groove, $b$, along its threaded portion, and $c$ represents a fish-plate or other bearing, through which the bolt is passed, and against which the washer $d$ rests. This washer is designed to be made of spring metal, and is in the form of a flattened ring open or divided at $z$, so that two ends are formed, one of which, $e$, is bent outward in the formation of the washer, and constitutes a resilient abutment or stop radially arranged with reference to the center of the washer. The other end of the washer is formed with an internal projection or lip, $g$, which, when the washer is arranged on the bolt, is designed to engage the groove $b$ therein. The open washer can be readily fitted to lie closely against the bolt without engaging the same by frictional contact, but by means of its end lip, $g$, engaging the groove. The washer is thus enabled to adjust itself with reference to the bolt longitudinally, but is prevented from rotating thereon. The washer is arranged on the bolt so that its resilient end $e$ is turned outward to engage the ratchet-base $h$ of the nut $n$. The bolt having been passed through the parts to be connected receives the washer, which is readily adjusted to the size of the bolt, so as to move easily thereon in the longitudinal direction, its lip $g$ being in engagement with the groove $b$. The nut is then screwed down on the washer, and engages its outwardly-turned end, so that a complete lock is formed.

Having described this invention, what I claim, and desire to secure by Letters Patent, is—

The open-ring nut-locking washer $d$, having the inwardly-projecting lip $g$ at one end to engage the groove $b$ of the bolt, and the outwardly-bent resilient end $e$ to engage the ratchet-base nut, substantially as specified.

In testimony whereof I affix my signature in presence of two witnesses.

GEORGE PAIST.

Witnesses:
 PHILIP C. MASI,
 THEO. MUNGEN.